(12) United States Patent
Hehn et al.

(10) Patent No.: US 10,844,779 B2
(45) Date of Patent: Nov. 24, 2020

(54) COOLING SYSTEM FOR E-CHARGER ASSEMBLY

(71) Applicant: Garrett Transportation I Inc., Torrance, CA (US)

(72) Inventors: Frederic Hehn, Ludres (FR); Damien Guepin, Dinoze (FR); Shankar Pandurangasa Solanki, Bangalore (FR); Emeric Genin, Jarville (FR); Valerie Bribant, Golbey (FR)

(73) Assignee: GARRETT TRANSPORTATION I INC, Torrance, CA (US)

( * ) Notice: Subject to any disclaimer, the term of this patent is extended or adjusted under 35 U.S.C. 154(b) by 144 days.

(21) Appl. No.: 16/128,039

(22) Filed: Sep. 11, 2018

(65) Prior Publication Data

US 2020/0080470 A1    Mar. 12, 2020

(51) Int. Cl.
*F02B 39/00*    (2006.01)
*F01D 25/12*    (2006.01)
(Continued)

(52) U.S. Cl.
CPC .......... *F02B 39/005* (2013.01); *F01D 25/125* (2013.01); *F01D 25/14* (2013.01); *F02B 29/0443* (2013.01); *F02B 37/10* (2013.01); *F02B 39/10* (2013.01); *F04D 25/0606* (2013.01); *F05D 2220/40* (2013.01)

(58) Field of Classification Search
CPC ........ F02B 39/005; F02B 39/10; F02B 39/16; F02B 39/164; F02B 37/10; F01D 25/125; F01D 25/14; F01D 25/12; F04D 25/0606; F04D 25/06; F04D 25/0626; F04D 29/5806; H02K 1/20; H02K 9/19–20; H02K 5/20; H02K 3/24
USPC .......... 60/607; 310/16, 52, 53, 216.119, 227; 123/565
See application file for complete search history.

(56) References Cited

U.S. PATENT DOCUMENTS

2014/0056726 A1* 2/2014 Garrard .................... H02K 9/19
                                                                    417/228
2014/0354090 A1   12/2014 Chamberlin
(Continued)

FOREIGN PATENT DOCUMENTS

WO    2018139497 A1    8/2018

*Primary Examiner* — Mark A Laurenzi
*Assistant Examiner* — Mickey H France
(74) *Attorney, Agent, or Firm* — Lorenz & Kopf LLP (57) ABSTRACT

An e-charger includes an outer housing and a rotor supported for rotation within the outer housing. A motor assembly is housed within the outer housing and includes an electric motor and a motor case. The electric motor is encased within the motor case. The electric motor is configured to drivingly rotate the rotor within the outer housing. Furthermore, the e-charger includes a cooling system configured to receive a coolant. The cooling system includes a manifold passage defined in the outer housing. The cooling system includes a first motor cooling circuit and a second motor cooling circuit that are cooperatively defined by the outer housing and the motor case. The first motor cooling circuit and the second motor cooling circuit are fluidly connected to the manifold passage. The manifold passage is configured to distribute a flow of the coolant between the first motor cooling circuit and the second motor cooling circuit.

20 Claims, 8 Drawing Sheets

(51) Int. Cl.
  *F01D 25/14* (2006.01)
  *F02B 29/04* (2006.01)
  *F02B 37/10* (2006.01)
  *F02B 39/10* (2006.01)
  *F04D 25/06* (2006.01)

(56) References Cited

U.S. PATENT DOCUMENTS

| | | | |
|---|---|---|---|
| 2015/0322851 A1* | 11/2015 | Cavagnaro | F01D 25/12 |
| | | | 415/208.2 |
| 2016/0028292 A1 | 1/2016 | Lin et al. | |
| 2017/0328269 A1* | 11/2017 | Yamashita | F01P 3/20 |
| 2019/0345956 A1 | 11/2019 | Iizuka et al. | |

\* cited by examiner

COOLING SYSTEM FOR E-CHARGER ASSEMBLY

TECHNICAL FIELD

The present disclosure generally relates to an e-charger and, more particularly, relates to a cooling system for an e-charger assembly.

BACKGROUND

Some vehicles include a charging device, such as a turbocharger or supercharger, that boosts engine performance by compressing air that is then fed to the engine. These devices may also be employed in fuel cell systems or other systems. In some cases, an e-charger may be provided. The e-charger may include an electric motor that is configured to drive and rotate a compressor wheel for compressing an airflow, which is then fed to an engine, a fuel cell stack, etc.

These charging devices may include a cooling system. In the case of an e-charger, for example, a cooling system may be provided that directs flow of a coolant through the device to maintain operating temperatures within a predetermined range. The electric motor may be cooled, for example, to improve operating efficiency of the motor.

However, conventional cooling systems for e-chargers suffer from various deficiencies, and operating efficiency may be negatively affected as a result. It may be difficult to provide an acceptable cooling effect for some charging devices and/or under certain operating conditions. There may be space constraints that limit the size and/or routing of the cooling circuit and, thus, negatively affects cooling performance.

Thus, it is desirable to provide a cooling system for an e-charger that improves the cooling effect. It is also desirable to provide an e-charger cooling system that is compact, highly manufacturable, and that is cost effective. Other desirable features and characteristics of the present disclosure will become apparent from the subsequent detailed description and the appended claims, taken in conjunction with the accompanying drawings and this background discussion.

BRIEF SUMMARY

In one embodiment, an e-charger is disclosed that includes an outer housing and a rotor that is supported for rotation within the outer housing. The e-charger includes a motor assembly that is housed within the outer housing. The motor assembly includes an electric motor and a motor case. The electric motor is encased within the motor case. The electric motor is configured to drivingly rotate the rotor within the outer housing. Furthermore, the e-charger includes a cooling system configured to receive a coolant. The cooling system includes a manifold passage defined in the outer housing. The cooling system includes a first motor cooling circuit and a second motor cooling circuit that are cooperatively defined by the outer housing and the motor case. The first motor cooling circuit and the second motor cooling circuit are fluidly connected to the manifold passage. The manifold passage is configured to distribute a flow of the coolant between the first motor cooling circuit and the second motor cooling circuit.

In another embodiment, an e-charger is disclosed that includes an outer housing, a rotor, a bearing that supports the rotor for rotation within the outer housing, and a motor assembly that is housed within the outer housing. The motor assembly includes an electric motor and a motor case. The electric motor is encased within the motor case, and the electric motor is configured to drivingly rotate the rotor within the outer housing. Furthermore, the e-charger includes a cooling system configured to receive a coolant. The cooling system includes a bearing cooling circuit and a manifold passage defined in the outer housing. The bearing cooling circuit is disposed upstream in-series from the manifold passage. The cooling system further includes a first motor cooling circuit and a second motor cooling circuit that are cooperatively defined by the outer housing and the motor case. The first motor cooling circuit and the second motor cooling circuit are fluidly connected to the manifold passage. The manifold passage is configured to distribute a flow of the coolant between the first motor cooling circuit and the second motor cooling circuit.

In an additional embodiment, a method of manufacturing an e-charger is disclosed that includes supporting an electric motor assembly and an attached rotor within an outer housing. The electric motor assembly includes an electric motor and a motor case. The electric motor is encased within the motor case. The electric motor is configured to drivingly rotate the rotor within the outer housing. The method also includes defining a cooling system configured to receive a coolant. The cooling system includes a manifold passage defined in the outer housing. The cooling system includes a first motor cooling circuit and a second motor cooling circuit that are cooperatively defined by the outer housing and the motor case. The first motor cooling circuit and the second motor cooling circuit are fluidly connected to the manifold passage. The manifold passage is configured to distribute a flow of the coolant between the first motor cooling circuit and the second motor cooling circuit.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved e-charger. The disclosed e-charger may be a device with an electrically driven compressor wheel that provides a compressed airstream to a downstream component (e.g., an engine, a fuel cell stack, etc.). Also, the e-charger of the present disclosure may be configured as an electric supercharger, as a hybrid turbocharger, as an e-boost device, e-turbo, e-assist charging device, or other related component.

In particular, an e-charger and methods of manufacturing the same are disclosed, wherein the e-charger also includes a fluid system for a coolant (i.e., "a cooling system"). The cooling system may include a first cooling circuit for cooling a rotational bearing in some embodiments. The cooling system may also include a second cooling circuit for cooling an electric motor assembly included within the e-charger. In some embodiments, the first and second cooling circuits may be disposed in-series relative to each other such that substantially all coolant flow from one is received by the other. Furthermore, in some embodiments, the second cooling circuit for cooling the electric motor may be downstream of the first cooling circuit for cooling the bearing.

The second cooling circuit may include a manifold passage that extends through the e-charger and that distributes coolant to predetermined areas of the motor assembly. In some embodiments, the cooling system may expose coolant to a circumferential face of the motor assembly, to a first longitudinal face of the assembly, and to a second longitudinal face of the motor assembly. In some embodiments, there may be one or more coolant separators, such as walls, ridges, or other barriers that separate individual coolant circuits for the motor assembly. Thus, coolant flow may be separated and controlled for cooling particular portions of the motor assembly. There may be a plurality of ports that fluidly connect a reservoir to the plurality of cooling circuits around the motor assembly. Each port may provide an individualized and tailored coolant flow and/or pressure loss about the motor assembly. In some embodiments, the size and/or orientation of the port may be specifically selected to provide a desired coolant flow and/or pressure loss through the cooling system.

The disclosed e-charger may provide various advantages. For example, the layout and construction of the cooling system may be relatively simple and compact. Furthermore, the e-charger may have high manufacturability due to these features. Coolant flow may be managed such that the cooling for the bearing and the electric motor may be highly effective. The e-charger may operate at high efficiency in a wide variety of operating conditions as a result.

Figure 1:
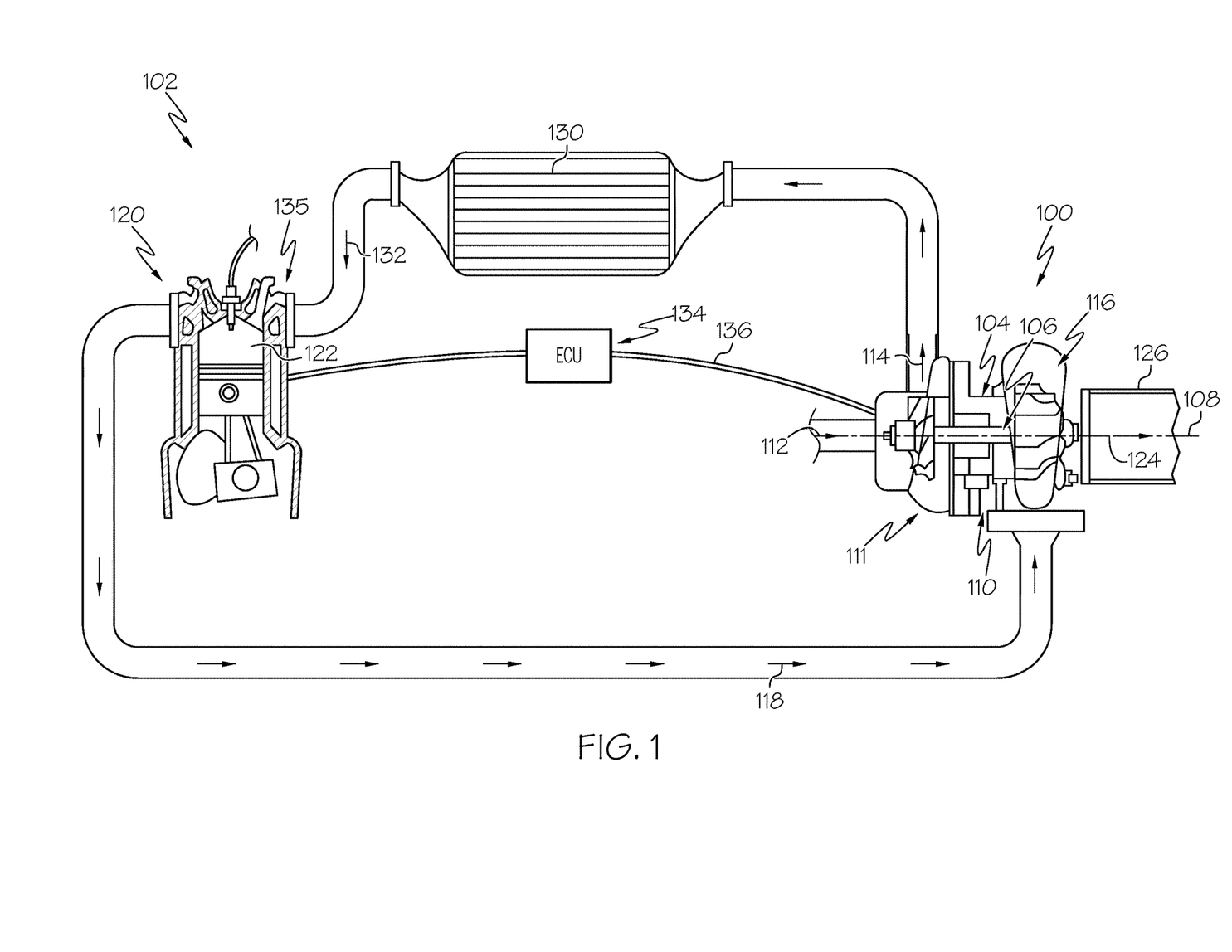
FIG. 1 is a schematic view of an engine system of a vehicle with an e-charger configured according to example embodiments of the present disclosure.

FIG. 1 is a schematic view of an example e-charger 100 according to example embodiments of the present disclosure. In some embodiments, the e-charger 100 may be incorporated within an engine system 102 of a vehicle.

Generally, the e-charger 100 may include an e-charger housing 104 and a rotor 106. The rotor 106 is configured to rotate within the e-charger housing 104 about an axis of rotor rotation 108.

The e-charger 100 may include a motor section 110. The motor section 110 may include an electric motor that selectively drives the rotor 106 in rotation about the axis 108.

The e-charger 100 may also include a compressor section 111. As a result of rotation of the rotor 106, the compressor section 111 of the e-charger 100 may compress a received input airstream 112 into a pressurized air stream 114.

The e-charger 100 may also include a turbine section 116. The turbine section 116 may be configured to receive a high-pressure and high-temperature exhaust gas stream 118 from an engine (e.g., from an exhaust manifold 120 of an internal combustion engine 122 or other type of engine). The turbine section 116 may transfer and/or convert energy of the exhaust gas stream 118. For example, the turbine section 116 may be operatively connected to an electric generator for generating electrical energy for the motor section 110. In additional embodiments, the turbine section 116 may drive the rotor 106 to drive rotation of the compressor section 111. The high-pressure exhaust gas stream 118 may become a lower-pressure exhaust gas stream 124 that is released into a downstream exhaust pipe 126.

From the compressor section 111, the pressurized air stream 114 may be characterized by an increased temperature, over that of the input air stream 112. Accordingly, the air stream 114 may be channeled through an air cooler 130 (i.e., an intercooler), such as a convectively cooled charge air cooler. The air cooler 130 may be configured to dissipate heat from the air stream 114, increasing its density. The resulting cooled and pressurized air stream 132 may be channeled into an intake manifold 135 of the internal combustion engine 122, or alternatively, into a subsequent-stage, in-series compressor. The operation of the system may be controlled by an ECU 134 (engine control unit) that connects to the remainder of the system via communication connections 136.

It will be appreciated that the e-charger 100 may be incorporated differently within the engine system 102 or within another system without departing from the scope of the present disclosure. For example, the e-charger 100 may be disposed within a fuel cell system in some embodiments.

In addition, it will be appreciated that the term "e-charger" as used herein is to be interpreted broadly, for example, to include devices with an electrically driven compressor wheel regardless of where the e-charger is incorporated, the type of system in which the e-charger is incorporated, etc. It will also be appreciated that the e-charger of the present disclosure may also be referred to as an electrically driven compressor assembly. Also, the e-charger of the present disclosure may be configured as an electric supercharger, as a hybrid turbocharger, as an e-boost device, e-turbo, or other related component.

Figure 2:
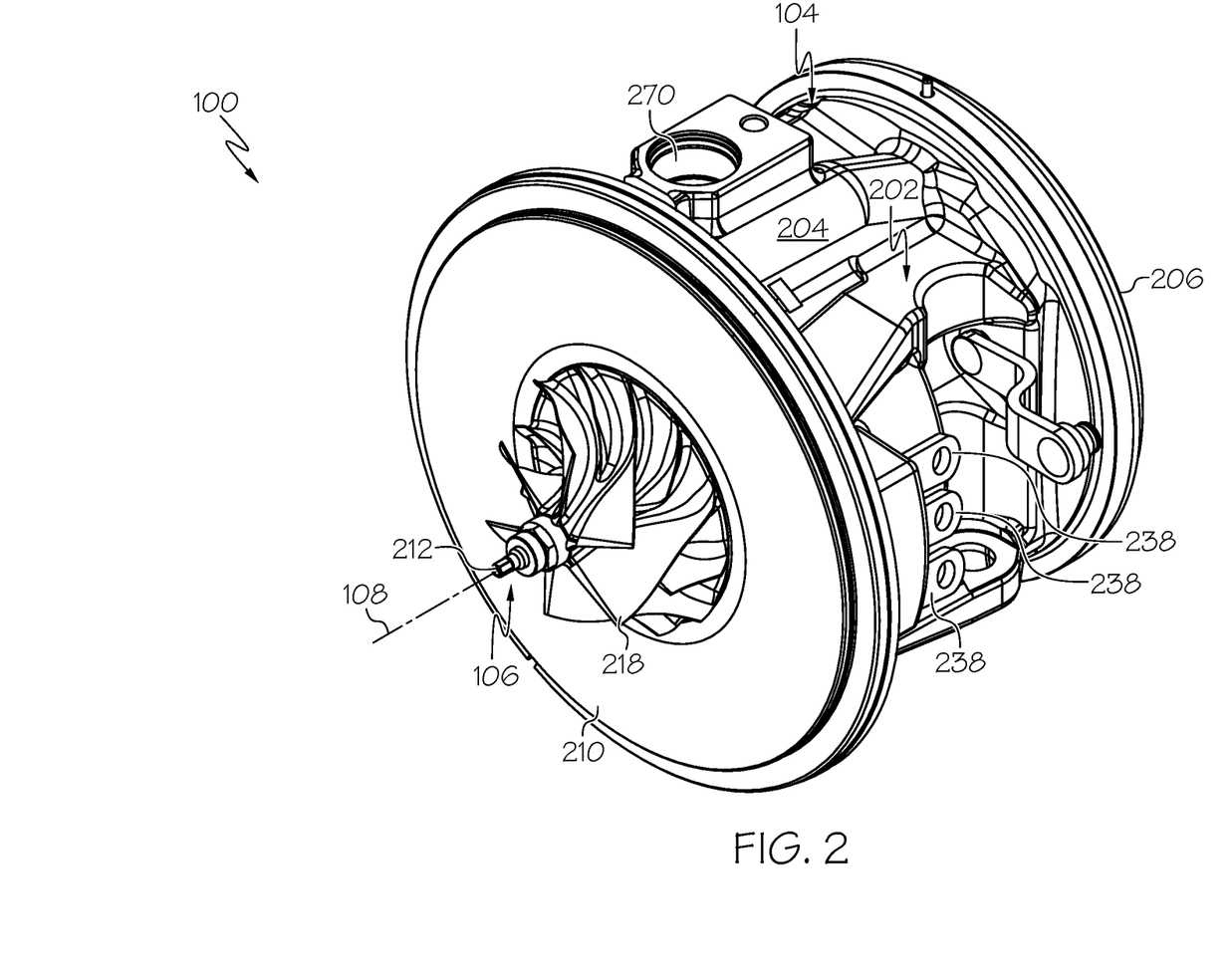
FIG. 2 is a perspective view of the e-charger of FIG. 1 according to example embodiments of the present disclosure.
Figure 3:
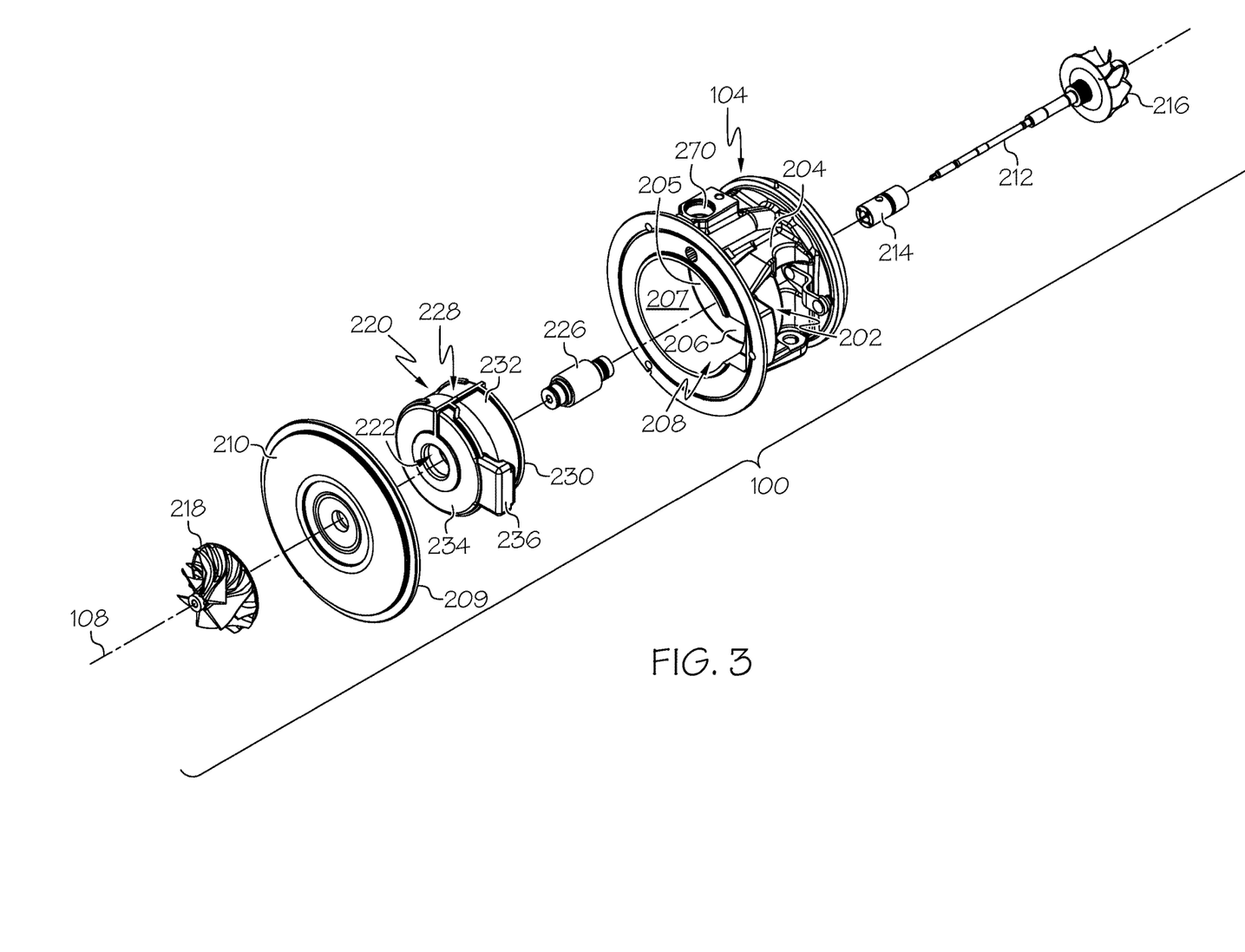
FIG. 3 is an exploded perspective view of the e-charger of FIG. 2.
Figure 4:
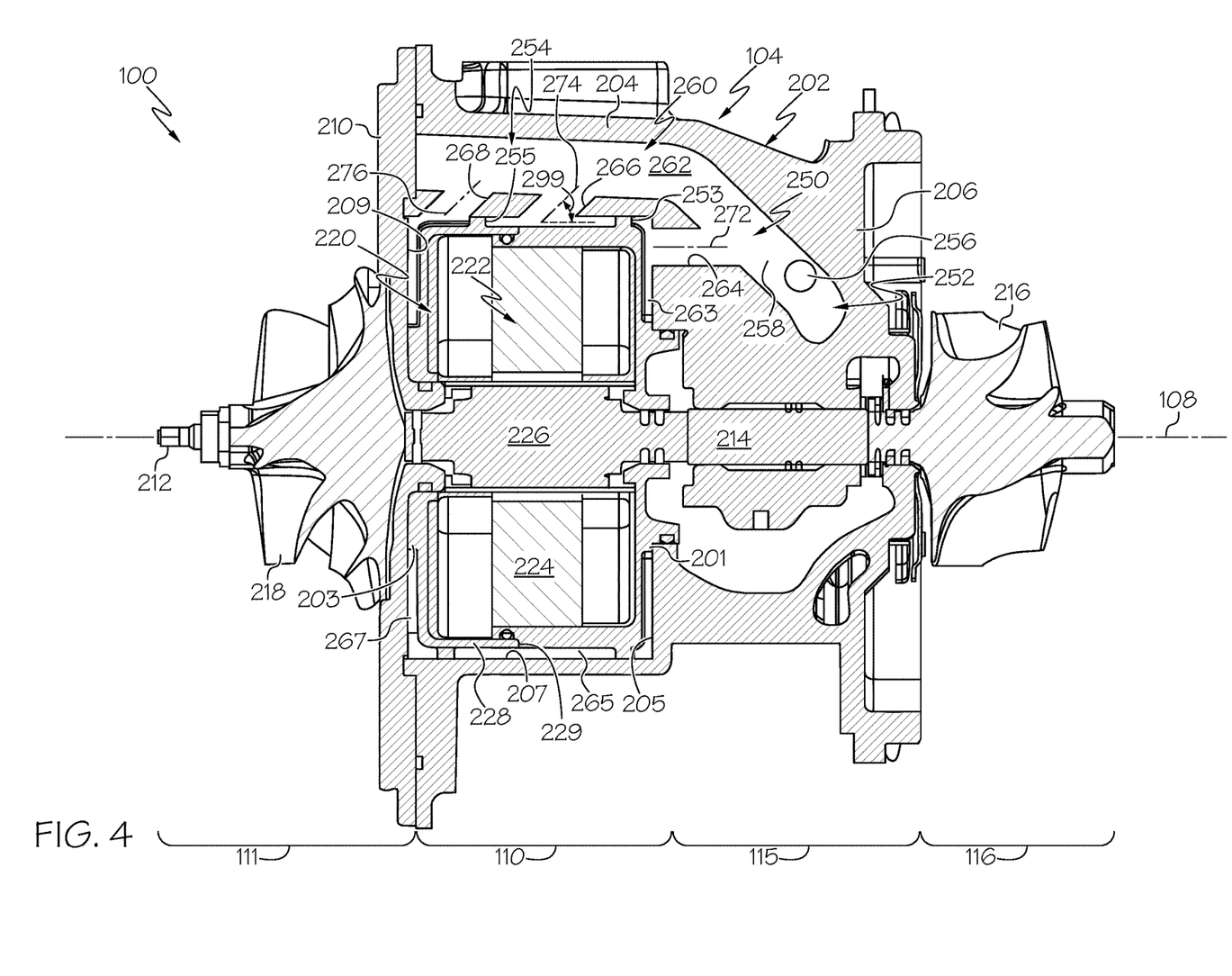
FIG. 4 is a longitudinal section view of the e-charger of FIG. 2.

Referring now to FIGS. 2-4, the e-charger 100 is illustrated in greater detail according to example embodiments. The compressor section 111, the motor section 110, and the turbine section 116 (described above) are indicated in FIG. 4, and will be discussed in more detail below. The e-charger 100 may also include a bearing section 115, which supports the rotor 106 for rotation within the e-charger housing 104 as will be discussed. Portions of the e-charger housing 104 are hidden for clarity.

The e-charger housing 104 may include an outer housing 202. The outer housing 202 may define portions of the motor section 110 as well as the bearing section 115. The outer housing 202 may be substantially cylindrical and hollow. The outer housing 202 may include a side wall 204 and an end block 206. The side wall 204 and end block 206 may cooperate to define a unitary, one-piece member made out of metal. In some embodiments, the side wall 204 and end block 206 may be formed by casting processes and may be made of steel or aluminum and various alloys thereof. The side wall 204 may be generally cylindrical and may extend in a circumferential direction about the axis 108. The side wall 204 may define a majority of the outer housing 202 within the motor section 110. The end block 206 may be rounded and may be disposed transverse (e.g., substantially perpendicular) to the axis 108. The end block 206 may define a majority of the outer housing 202 within the bearing section 115. The side wall 204 and the end block 206 may cooperate to define a cylindrical motor cavity 208 as shown in FIG. 3.

The outer housing 202 may further include an end plate 210 that is fixed to the side wall 204 on a longitudinal end that is opposite the end block 206. The end plate 210 may be round and generally flat and disposed transverse (e.g., substantially perpendicular) to the axis 108. The end plate 210 may be removably attached to the side wall 204 to cover over and close off the motor cavity 208. Accordingly, the motor cavity 208 may be defined by a first end interior surface 205 of the end block 206, an inner diameter surface 207 of the side wall 204, and a second end interior surface 209 of the end plate 210.

The rotor 106 is shown in detail as well in FIGS. 3 and 4. The rotor 106 may include an elongate shaft 212 that is centered on the axis 108. The shaft 212 may extend continuously through the compressor section 111, the motor section 110, the bearing section 115, and the turbine section 116. The shaft 212 may also extend through the end block 206 and the end plate 210 of the outer housing 202.

The e-charger 100 may further include a bearing 214. The bearing 214 may support the shaft 212 for rotation relative to the outer housing 202. The bearing 214 may be disposed within the bearing section 115 as shown in FIG. 4. In some embodiments, the bearing 214 may be a roller-type bearing with an outer member (e.g., an outer race) that is fixed to the end block 206 of the outer housing 202, an inner member (e.g., an inner race) that is fixed to the shaft 212, and a plurality of roller members that are disposed between the outer member and the inner member for supporting rotation of the shaft 212 relative to the outer housing 202. However, it will be appreciated that the bearing 214 may be configured differently without departing from the scope of the present disclosure. For example, in additional embodiments, the bearing 214 may be a plain bearing.

The e-charger 100 may further include a turbine wheel 216. The turbine wheel 216 may be mounted on one end of the shaft 212 within the turbine section 116. The turbine wheel 216 may include a plurality of blades. The turbine wheel 216 may be housed within a turbine housing (not shown) of the e-charger housing 104. The turbine housing may be a volute structure in some embodiments. The exhaust gas stream 118 may rotate the turbine wheel 216, for example, to generate electric energy and/or to drive rotation of the shaft 212 within the compressor section 111.

Additionally, the e-charger 100 may include a compressor wheel 218. The compressor wheel 218 may be mounted on an end of the shaft 212 within the compressor section 111. In some embodiments, the compressor wheel 218 may be attached at an end of the shaft 212 that is opposite the turbine wheel 216. The compressor wheel 218 may include a plurality of blades. The compressor wheel 218 may be housed within a compressor housing (not shown) of the e-charger housing 104. The compressor housing may be a volute structure in some embodiments. The compressor wheel 218 may be driven in rotation about the axis 108 to compress the input airstream 112, thereby producing the pressurized airstream 114.

Figure 6:
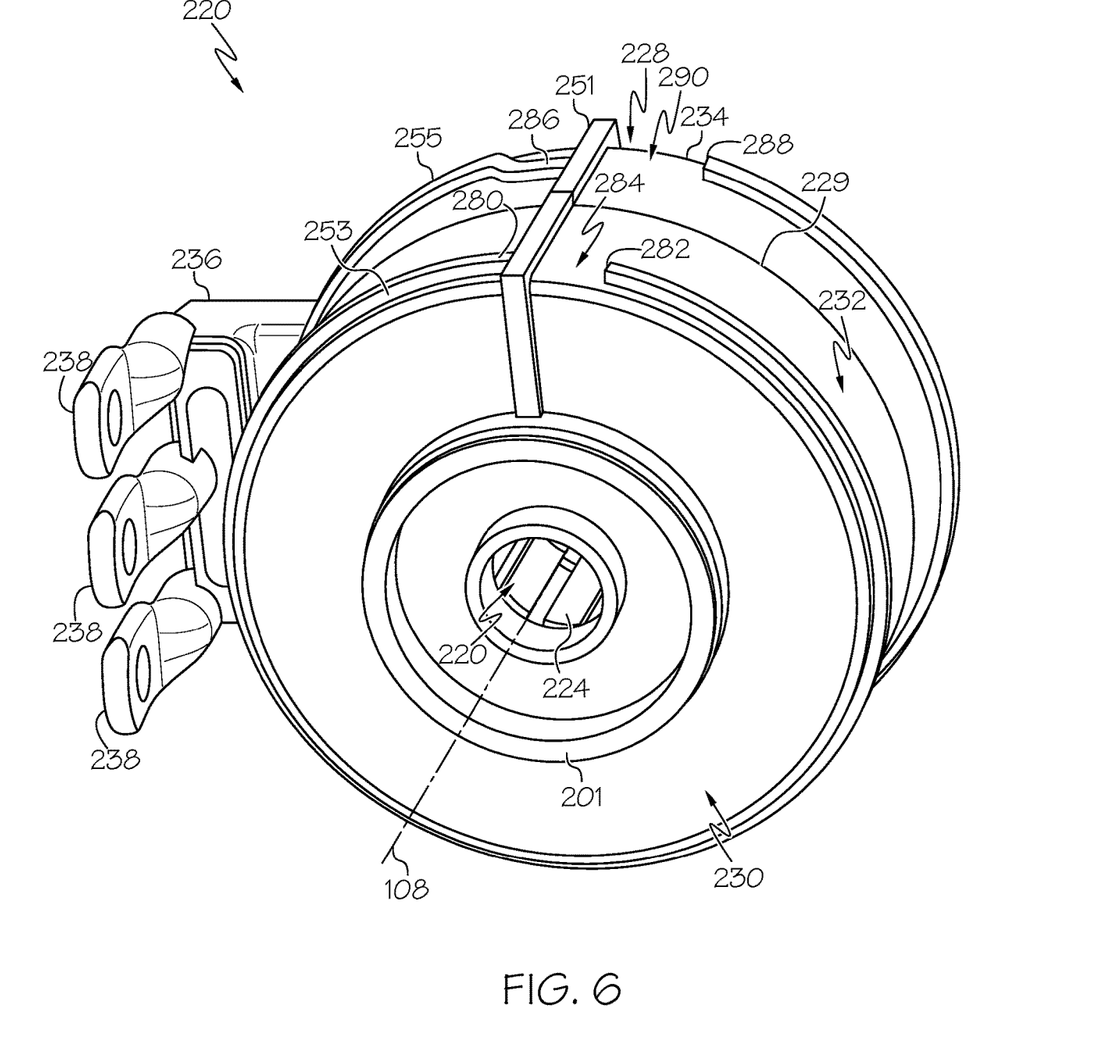
FIG. 6 is a perspective view of a motor case of the e-charger of FIG. 2.

Furthermore, the motor section 110 of the e-charger 100 may include a motor assembly 220 shown in detail in FIG. 6. The motor assembly 220 may be disposed within the motor section 110. The motor assembly 220 may generally include an electric motor 222 and a motor case 228 that encases the motor 222.

The motor 222 may include a stator 224 and a rotor 226. The rotor 226 may be fixed to the shaft 212 and supported for rotation within the motor case 228. Both the rotor 226 and the stator 224 may be encased within the motor case 228. The motor assembly 220 may further include a terminal block 236 with a plurality of terminals 238 that projects from one side of the motor case 228. There may be three terminals 238 in some embodiments for supplying three-phase power to the motor assembly 220. Electrical power supplied to the terminals 238 may drive rotation of the rotor 226 and shaft 212 to, in turn, drive rotation of the compressor wheel 218.

The motor case 228 may be substantially cylindrical and hollow in some embodiments. The exterior of the motor case 228 may include a first longitudinal end face 230, a circumferential face 232, and a second longitudinal end face 234. The circumferential face 232 may extend circumferentially about the axis 108 and may be centered with respect to the axis 108. The first and second longitudinal end faces 230, 234 may be attached on opposite ends of the circumferential face 232. The first and second longitudinal end faces 230, 234 may be annular and may be disposed substantially perpendicular to the axis 108. The rotor 226 and the stator 224 may be disposed between the first and second longitudinal end faces 230, 234, and the shaft 212 may extend through openings in the first and second longitudinal end faces 230, 234. In some embodiments, the motor case 228 may be formed via a casting process and may be formed of metal. In some embodiments, the motor case 228 may be a multi-part shell. For example, one member of the motor case 228 may define the first longitudinal end face 230 and part of the circumferential face 232, and another member of the motor case 228 may define the second longitudinal end face 234 and the other part of the circumferential face 232, and the members may be attached at a sealed circumferential joint 229 (FIGS. 4 and 6).

The motor assembly 220 may be supported within the motor cavity 208. As such, the first longitudinal end face 230 may oppose the first end interior surface 205 of the outer housing 202, the circumferential face 232 may oppose the inner diameter surface 207 of the outer housing 202, and the second longitudinal end face 234 may oppose the second end interior surface 209 of the outer housing 202.

Furthermore, the e-charger 100 may include a cooling system 250. The cooling system 250 may include a plurality of fluid channels, reservoirs, passages, circuits, etc. that receive one or more flows of liquid coolant. The coolant may flow through the cooling system 250 and remove heat from the e-charger 100 to maintain high operating efficiency. Coolant flow through the cooling system 250 is illustrated schematically in FIGS. 7 and 8. In some embodiments, at least some of the fluid passages of the cooling system 250 may be defined by the outer housing 202. Also, in some embodiments, at least some of the fluid passages of the cooling system 250 may be cooperatively defined by the outer housing 202 and the motor case 228.

As shown in the illustrated embodiments, the cooling system 250 may generally include a bearing cooling circuit 252 and a motor cooling manifold circuit 254. The bearing cooling circuit 252 may be configured for removing heat (cooling) the bearing 214 and surrounding portions of the e-charger 100, whereas the motor cooling manifold circuit 254 may be configured for removing heat (cooling) the motor assembly 220 and surrounding portions of the e-charger 100. In some embodiments, the cooling system 250 may be configured with the bearing cooling circuit 252 and the motor cooling manifold circuit 254 arranged in-series such that flow from one is received by the other. For example, as shown in the illustrated embodiment, the motor cooling manifold circuit 254 may be arranged in-series and downstream from the bearing cooling circuit 252. Accordingly, coolant flow from the bearing cooling circuit 252 may be received by the motor cooling manifold circuit 254.

The bearing cooling circuit 252 may be an annular and continuous channel that is defined in the outer housing 202. The bearing cooling circuit 252 may extend circumferentially about the axis 108 and may encircle the bearing 214. Furthermore, as shown in FIG. 4, the bearing cooling circuit 252 may extend along the axis 108 to cool both longitudinal ends of the bearing 214. Also, the bearing cooling circuit 252 may include at least one inlet 256 and at least one outlet 258. In some embodiments, there may be only the single inlet 256 and only the single outlet 258 for the bearing cooling circuit 252. The inlet 256 may extend transverse to the axis 108, through the outer housing 202 as indicated in FIG. 4. The outlet 258 may be fluidly connected to the motor cooling manifold circuit 254.

The motor cooling manifold circuit 254 may include a manifold passage 260. The manifold passage 260 may be defined in the outer housing 202. The manifold passage 260 may include an intake reservoir 262 and at least two ports, such as a first port 264, and a second port 266, and a third port 268. The manifold passage 260 may be fluidly connected to the outlet 258 such that the manifold passage 260 is configured to receive flow from the bearing cooling circuit 252. The manifold passage 260 may distribute the received coolant between different downstream cooling circuits as will be discussed in greater detail below.

The intake reservoir 262 may extend longitudinally through the outer housing 202. More specifically, as shown in FIG. 4, the intake reservoir 262 may be fluidly connected to the outlet 258 and may be in-series and downstream with respect to the outlet 258. The intake reservoir 262 may extend from the outlet 258, along the axis 108, away from the bearing section 115 and into the motor section 110 of the e-charger 100. An upstream portion of the intake reservoir 262 defined within the bearing section 115 may be angled outward radially from the axis 108. A downstream portion of the intake reservoir 262 defined within the side wall 204 may extend substantially parallel to the axis 108.

The first port 264, the second port 266, and the third ports 268 may be holes or other apertures. In some embodiments, the first, second, and third ports 264, 266, 268 may be through-holes. Furthermore, in some embodiments, the first, second, and third ports 264, 266, 268 may be machined (e.g., drilled) holes that are formed through the outer housing 202.

In some embodiments, the first port 264 may extend along a first axis 272 and may extend through the end block 206 to fluidly connect the intake reservoir 262 to a first motor cooling circuit 263. The first axis 272 may be substantially parallel to the axis 108 in some embodiments.

Also, the second port 266 may extend along a second axis 274 and may extend through the side wall 204 to fluidly connect the intake reservoir 262 to a second motor cooling circuit 265. In some embodiments, the second axis 274 may be disposed at an acute angle 299 relative to the axis 108. The second axis 274 may be angled relative to the axis 108 such that flow from the second port 266 is directed inward radially and generally toward the compressor section 111.

Likewise, the third port 268 may extend along a third axis 276 and may extend through the side wall 204 to fluidly connect the intake reservoir 262 to a third motor cooling circuit 267. In some embodiments, the third axis 276 may be disposed at an acute angle relative to the axis 108. In some embodiments, the second axis 274 and the third axis 276 may be substantially parallel to each other (i.e., both disposed at the same angle 299 relative to the axis 108).

The first, second, and third ports 264, 266, 268 may be longitudinally spaced apart at a distance along the manifold passage 260. As shown in FIG. 4, the second port 266 may be disposed longitudinally (with respect to the axis 108) between the first port 264 and the third port 268.

The first, second, and third motor cooling circuits 263, 265, 267 may be cooperatively defined between the exterior surface of the motor case 228 and the interior surface of the outer housing 202. In some embodiments, the first, second, and third motor cooling circuits 263, 265, 267 may be fluidly separated from each other via one or more fluid boundary members (i.e., dams). In the illustrated embodiment, the dams are included on the motor case 228 and project radially away from the exterior surface of the motor case 228. However, one or more dams may be included on the outer housing 202 without departing from the scope of the present disclosure.

Specifically, the first, second, and third motor cooling circuits 263, 265, 267 may be partly defined by a longitudinal dam 251 (FIG. 6). The longitudinal dam 251 may be a ridge, rib, wall, or other elongate member that extends radially along the first longitudinal end face 230, across the circumferential face 232 substantially parallel to the axis 108, and radially along the second longitudinal end face 234. The longitudinal dam 251 may project from these faces of the motor case 228 and may abut against the first end interior surface 205, the inner diameter surface 207, and the second end interior surface 209 of the outer housing 202. In some embodiments, the longitudinal dam 251 may provide a fluid boundary between an inlet side and an outlet side of the motor case 228.

Furthermore, the first and second motor cooling circuits 263, 265 may be partly defined by a first circumferential dam 253. The first circumferential dam 253 may be a ridge, rib, wall, or other elongate member that extends circumferentially about the circumferential face 232, proximate the first longitudinal end face 230. The first circumferential dam 253 may project from the circumferential face 232 and may abut against the inner diameter surface 207. As shown in FIG. 6, the first circumferential dam 253 may include a first dam end 280 that is connected to the longitudinal dam 251 (on the inlet side of the motor case 228) and an opposing second dam end 282 (a terminal end) that is spaced apart from the longitudinal dam 251 (on the outlet side of the motor case 228) so as to define a circumferential space 284 therebetween. As such, the first motor cooling circuit 263 may be fluidly connected to the second motor cooling circuit 265 via the space 284.

The first motor cooling circuit 263 may also be defined by a first inner rim 201 (FIG. 6). The first inner rim 201 may be annular and may project axially from the first longitudinal end face 230.

Additionally, the second and third motor cooling circuits 265, 267 may be partly defined by a second circumferential dam 255. The second circumferential dam 255 may be a ridge, rib, wall, or other elongate member that extends circumferentially about the circumferential face 232, proximate the second longitudinal end face 234. The second circumferential dam 255 may project from the circumferential face 232 and may abut against the inner diameter surface 207. As shown in FIG. 6, the second circumferential dam 255 may include a first dam end 286 that is connected to the longitudinal dam 251 (on the inlet side of the motor case 228) and an opposing second dam end 288 (a terminal end) that is spaced apart from the longitudinal dam 251 (on the outlet side of the motor case 228) so as to define a circumferential space 290 therebetween. As such, the third motor cooling circuit 267 may be fluidly connected to the second motor cooling circuit 265 via the space 290.

The third motor cooling circuit 267 may also be defined by a second inner rim 203 (FIG. 4). The second inner rim 203 may be annular and may project axially from the second longitudinal end face 234.

In some embodiments, the outer surfaces of the motor case 228 may be substantially smooth but for the dams 251, 253, 255 and the first and second inner rims 201, 203. This may increase manufacturability for the motor case 228.

Figure 5:
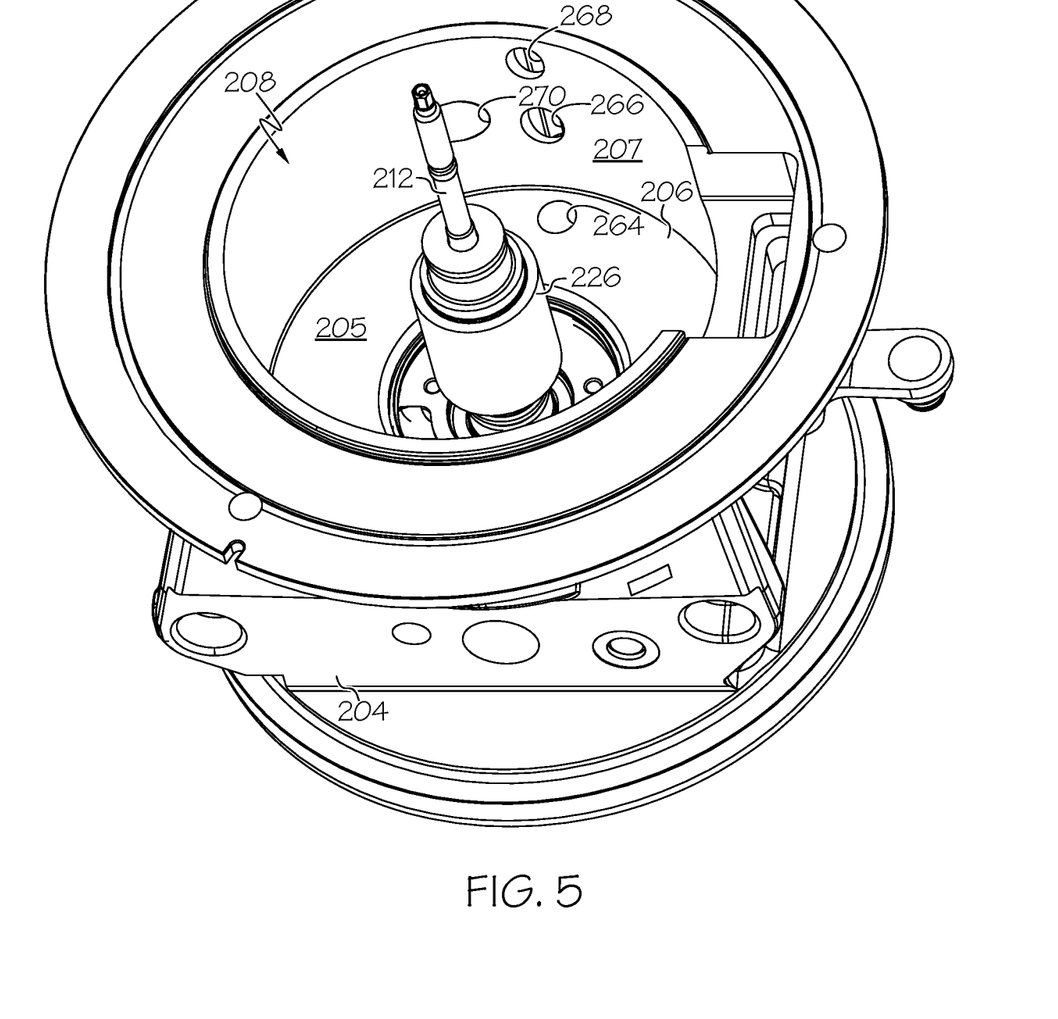
FIG. 5 is a perspective view of a portion of the e-charger of FIG. 2.
Figure 8:
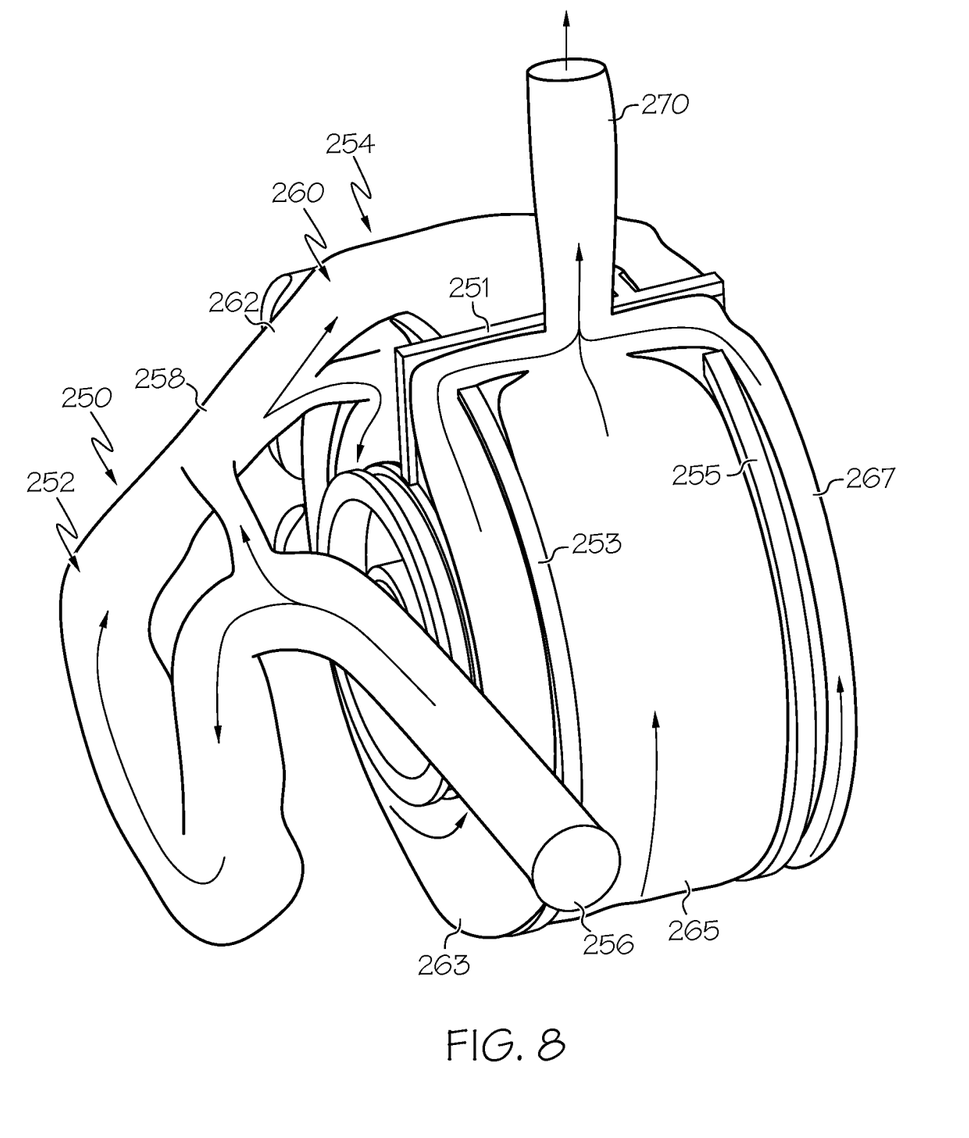
FIG. 8 is a perspective view of a second side of the motor case of FIG. 6 with a schematic representation of the coolant flow included thereon.

The motor cooling manifold circuit 254 may further include an outlet 270 (FIGS. 2, 3, 5, and 8). The outlet 270 may be the only outlet (a single, solitary outlet) of the circuit 254 such that substantially all coolant flow within the circuit 254 exits via the outlet 270. The outlet 270 may be a through-hole or other aperture that extends through the side wall 204 of the outer housing 202. As shown in FIG. 5, the outlet 270 may be spaced apart angularly from the longitudinal plane that contains the first port 264, second port 266, and third port 268. In some embodiments, the longitudinal dam 251 may be disposed angularly between the outlet 270 and the ports 264, 266, 268. Thus, the longitudinal dam 251 may provide a fluid barrier for coolant flowing in from the ports 264, 266, 268, causing the fluid to flow circumferentially about the motor case 228. As shown in FIG. 8, the outlet 270 may be fluidly connected to the first, second, and third motor cooling circuits 263, 265, 267. For example, the outlet 270 may be centered on the second motor cooling circuit 265, the space 284 may fluidly connect the first motor cooling circuit 267 and the outlet 270, and the space 290 may fluidly connect the third motor cooling circuit 269 and the outlet 270.

Accordingly, the first motor cooling circuit 263 may be cooperatively defined by the first longitudinal end face 230, the first end interior surface 205, the first circumferential dam 253, the first inner rim 201, and the longitudinal dam 251. The second motor cooling circuit 265 may be cooperatively defined by the circumferential face 232, the inner diameter surface 207, the first circumferential dam 253, the second circumferential dam 255, and the longitudinal dam 251. The third motor cooling circuit 267 may be cooperatively defined by the second longitudinal end face 234, the second end interior surface 209, the second circumferential dam 255, the second inner rim 203, and the longitudinal dam 251.

Figure 7:
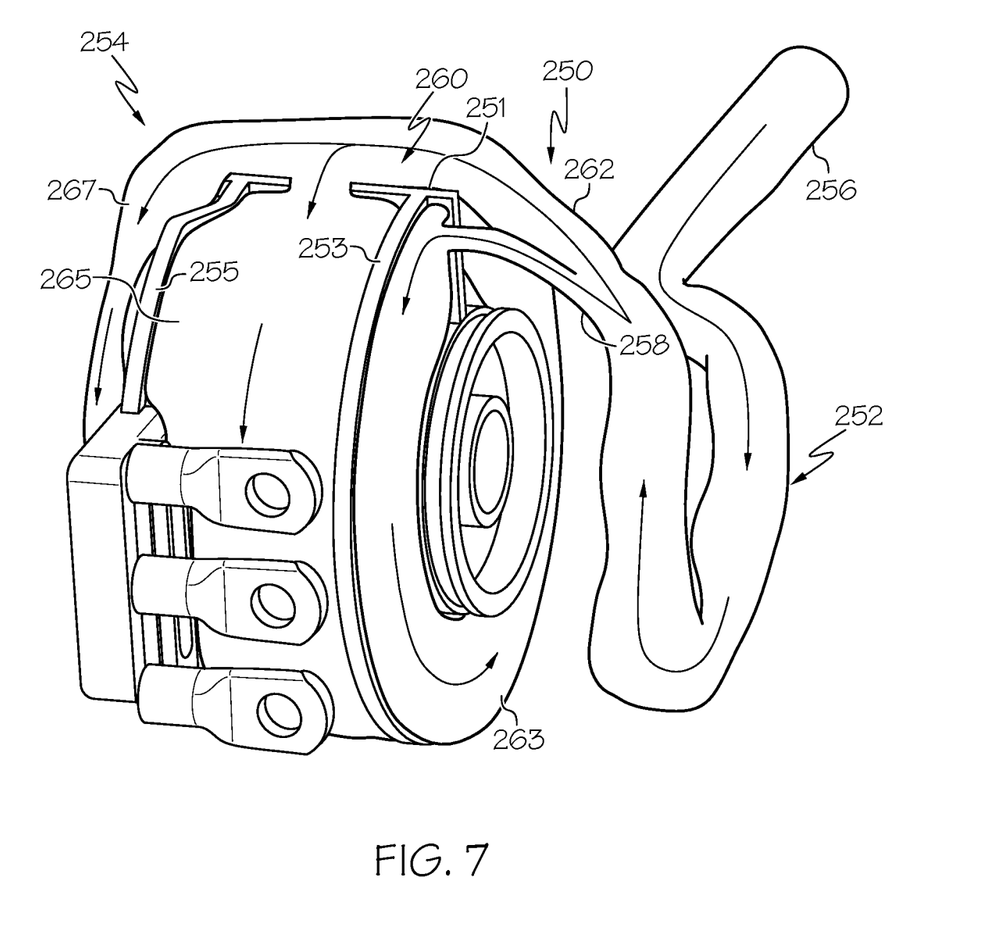
FIG. 7 is a perspective view of a first side of the motor case of FIG. 6 with a schematic representation of a flow of coolant included thereon.

Therefore, as shown in FIGS. 7 and 8, coolant may flow in via the inlet 256, flow through the bearing cooling circuit 252, and flow to the outlet 258 removing heat from the bearing 214 as it flows. This coolant flow may be received by the motor cooling manifold circuit 254. Specifically, flow received from the outlet 258 by the intake reservoir 262 may be distributed between the first port 264, the second port 266, and the third port 268. Coolant entering the first motor cooling circuit 263 from the first port 264 may flow circumferentially about the first longitudinal end face 230 of the motor assembly 220 and may flow out the outlet 270. Coolant entering the second motor cooling circuit 265 from the second port 266 may flow circumferentially about the circumferential face 232 of the motor assembly 220 and may flow out the outlet 270. Furthermore, coolant entering the third motor cooling circuit 267 from the third port 268 may flow circumferentially about the second longitudinal end face 234 of the motor assembly 220 and may flow out the outlet 270. This flow through the motor cooling manifold circuit 254 may remove heat from the motor (e.g., heat at the stator 224, rotor 226, fluid seals, etc.) to maintain efficient motor operation.

It will be appreciated that the cooling system 250 provides effective cooling. Also, the e-charger 100 is relatively compact, with a highly manufacturable design. Moreover, because the bearing cooling circuit 252 and motor cooling manifold circuit 254 are arranged in-series, there may be relatively few interfaces, seals, etc. to maintain. Additionally, this layout increases manufacturability. Furthermore, because there is a plurality of independent cooling circuits within the motor cooling manifold circuit 254, the coolant flow for the motor assembly 220 may be specifically tailored for specific areas of the motor assembly 220. Also, the cooling system 250 may maintain suitable fluid pressure throughout and may avoid significant pressure loss therethrough.

The e-charger 100 may be manufactured as described above. As mentioned, the outer housing 202 may be formed via casting methods. Then, the ports 264, 266, 268 and the outlet 270 may be machined into the outer housing 202. The motor case 228 may also be cast, and the motor 222 may be assembled within the motor case 228 and attached to the rotor 106. Next, the rotor 106 and the motor assembly 220 may be assembled within the outer housing 202.

In some embodiments, one or more of the ports 264, 266, 268 and/or the outlet 270 may be adjusted according to a predetermined target flow characteristic. For example, if pressure loss within the cooling system 250 is too great within the second motor cooling circuit 265, then a user may determine how to adjust the second port 266 (e.g., using a computerized fluid dynamics model). Specifically, the user may determine a new, adjusted size (diameter) of the second port 266 and/or a new, adjusted angle 299 for the axis 274 of the second port 266. Then, the second port 266 may be adjusted, for example, by re-drilling the second port 266. The first port 264 and the third port 268 may be similarly adjusted to change flow characteristics of the first motor cooling circuit 263 and the third motor cooling circuit 267, respectively. Thus, an existing e-charger 100 design may be adjusted quickly and easily by adjusting the ports 264, 266, 268. Also, during a development phase of the e-charger 100, the size/orientation of the individual ports 264, 266, 268 may be variables that can be adjusted for controlling and adjusting the flow characteristics through the cooling system 250.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An e-charger comprising:
   an outer housing;
   a rotor that is supported for rotation within the outer housing;

a motor assembly that is housed within the outer housing, the motor assembly including an electric motor and a motor case, the electric motor encased and fluidly sealed within the motor case, the electric motor configured to drivingly rotate the rotor within the outer housing; and a cooling system configured to receive a coolant, the cooling system including a manifold passage defined in the outer housing, the cooling system including a first motor cooling circuit and a second motor cooling circuit that are cooperatively defined by the outer housing and the motor case, the motor case fluidly isolating the electric motor from the coolant, the first motor cooling circuit and the second motor cooling circuit being fluidly connected to the manifold passage, the manifold passage configured to distribute a flow of the coolant between the first motor cooling circuit and the second motor cooling circuit.

2. The e-charger of claim 1, wherein the motor case includes a circumferential face and a longitudinal end face;
wherein the first motor cooling circuit is partly defined by the circumferential face; and
wherein the second motor cooling circuit is partly defined by the longitudinal end face.

3. The e-charger of claim 2, wherein the cooling system includes a third motor cooling circuit that is fluidly connected to the manifold passage;
wherein the manifold passage is configured to distribute the flow of the coolant between the first motor cooling circuit, the second motor cooling circuit, and the third motor cooling circuit;
wherein the longitudinal end face is a first longitudinal end face;
wherein the motor case includes a second longitudinal end face; and
wherein the third motor cooling circuit is partly defined by the second longitudinal end face.

4. The e-charger of claim 1, wherein at least one of the motor case and the outer housing includes a dam that defines a fluid boundary for at least one of the first motor cooling circuit and the second motor cooling circuit.

5. The e-charger of claim 4, wherein the motor case includes an exterior surface, a circumferential dam, and a longitudinal dam;
wherein the circumferential dam and the longitudinal dam project radially from the exterior surface;
wherein the circumferential dam extends circumferentially along the exterior surface; and
wherein the longitudinal dam extends longitudinally along the exterior surface.

6. The e-charger of claim 5, wherein the longitudinal dam defines a fluid boundary between an inlet side of the motor case and an outlet side of the motor case;
wherein the circumferential dam includes a first end that is connected to the longitudinal dam on the inlet side of the motor case;
wherein a space is defined between a second end of the circumferential dam and the longitudinal dam on the outlet side of the motor case;
wherein the first motor cooling circuit and the second motor cooling circuit are fluidly connected to the manifold passage proximate the inlet side; and
wherein the first motor cooling circuit and the second motor cooling circuit are fluidly connected via the space.

7. The e-charger of claim 1, wherein the outer housing includes a casting;

wherein the manifold passage includes a first machined hole in the casting and a second machined hole in the casting; and
wherein the first motor cooling circuit is fluidly connected to the first machined hole; and
wherein the second motor cooling circuit is fluidly connected to the second machined hole.

8. The e-charger of claim 1, wherein the manifold passage includes an intake reservoir, a first port, and a second port;
wherein the intake reservoir extends longitudinally within the outer housing;
wherein the first port fluidly connects the intake reservoir and the first motor cooling circuit; and
wherein the second port fluidly connects the intake reservoir and the second motor cooling circuit.

9. The e-charger of claim 8, wherein the rotor is supported for rotation within the housing about a rotor axis;
wherein the first port and the second port are spaced apart at a distance longitudinally;
wherein the first port extends along a first port axis, the first port axis being substantially parallel to the rotor axis; and
wherein the second port extends along a second port axis, the second port axis being disposed at an angle relative to the rotor axis.

10. The e-charger of claim 8, wherein the outer housing includes a side wall and an end block;
wherein the side wall extends circumferentially about a rotor axis;
wherein the end block is disposed transverse to the rotor axis;
wherein the side wall and the end block cooperate to define a motor cavity that receives the motor assembly;
wherein the first port extends through the end block to fluidly connect the intake reservoir and the first motor cooling circuit; and
wherein the second port extends through the side wall to fluidly connect the intake reservoir and the second motor cooling circuit.

11. The e-charger of claim 1, wherein the cooling system includes a bearing cooling circuit that is disposed upstream of the manifold passage.

12. An e-charger comprising:
an outer housing;
a rotor;
a bearing that is supports the rotor for rotation within the outer housing;
a motor assembly that is housed within the outer housing, the motor assembly including an electric motor and a motor case, the electric motor encased and fluidly sealed within the motor case, the electric motor configured to drivingly rotate the rotor within the outer housing; and
a cooling system configured to receive a coolant, the cooling system including a bearing cooling circuit and a manifold passage defined in the outer housing, the bearing cooling circuit being disposed upstream in-series from the manifold passage, the cooling system further including a first motor cooling circuit and a second motor cooling circuit that are cooperatively defined by the outer housing and the motor case, the motor case fluidly isolating the electric motor from the coolant, the first motor cooling circuit and the second motor cooling circuit being fluidly connected to the manifold passage, the manifold passage configured to distribute a flow of the coolant between the first motor cooling circuit and the second motor cooling circuit.

13. The e-charger of claim 12, wherein the bearing cooling circuit is continuous and annular.

14. The e-charger of claim 12, wherein the bearing cooling circuit includes a single inlet and a single outlet;
wherein the manifold passage includes an intake reservoir, a first port, and a second port;
wherein the intake reservoir is fluidly connected to the single outlet; and
wherein the intake reservoir is in-series and downstream with respect to the single outlet.

15. The e-charger of claim 14, wherein the intake reservoir extends longitudinally within the outer housing;
wherein the manifold passage includes a first port that fluidly connects the intake reservoir and the first motor cooling circuit; and
wherein the manifold passage includes a second port that fluidly connects the intake reservoir and the second motor cooling circuit.

16. The e-charger of claim 15, wherein the rotor is supported for rotation within the housing about a rotor axis;
wherein the first port extends along a first port axis, the first port axis being substantially parallel to the rotor axis; and
wherein the second port extends along a second port axis, the second port axis being disposed at an angle relative to the rotor axis.

17. The e-charger of claim 12, wherein the cooling system includes a third motor cooling circuit that is fluidly connected to the manifold passage; and
wherein the manifold passage is configured to distribute the flow of the coolant between the first motor cooling circuit, the second motor cooling circuit, and the third motor cooling circuit.

18. The e-charger of claim 17, wherein the motor case includes a circumferential face, a first longitudinal end face, and a second longitudinal end face; and
wherein the first motor cooling circuit is at least partly defined by the first longitudinal end face;
wherein the second motor cooling circuit is defined by the circumferential face; and
wherein the third motor cooling circuit is at least partly defined by the second longitudinal end face.

19. A method of manufacturing an e-charger comprising:
supporting an electric motor assembly and an attached rotor within an outer housing, the electric motor assembly including an electric motor and a motor case, the electric motor encased and fluidly sealed within the motor case, the electric motor configured to drivingly rotate the rotor within the outer housing;
defining a cooling system configured to receive a coolant, the cooling system including a manifold passage defined in the outer housing, the cooling system including a first motor cooling circuit and a second motor cooling circuit that are cooperatively defined by the outer housing and the motor case, the motor case fluidly isolating the electric motor from the coolant, the first motor cooling circuit and the second motor cooling circuit being fluidly connected to the manifold passage, the manifold passage configured to distribute a flow of the coolant between the first motor cooling circuit and the second motor cooling circuit.

20. The method of claim 19, further comprising forming the manifold passage to include an intake reservoir, a first port, and a second port;
wherein the outer housing extends along a longitudinal axis;
further comprising forming a first port through the outer housing, the first port fluidly connecting the intake reservoir and the first motor cooling circuit;
further comprising forming a second port through the outer housing, the second port fluidly connecting the intake reservoir and the second motor cooling circuit;
wherein forming the first port includes forming the first port at one of a predetermined size and a predetermined angle relative to the longitudinal axis; and
wherein forming the second port includes forming the second port at one of a predetermined size and a predetermined angle relative to the longitudinal axis.

\* \* \* \* \*